No. 676,390.  
T. C. NEWLON.  
LINE GRIP OR HOLDER.  
(Application filed Feb. 23, 1901.)
(No Model.)
Patented June 11, 1901.
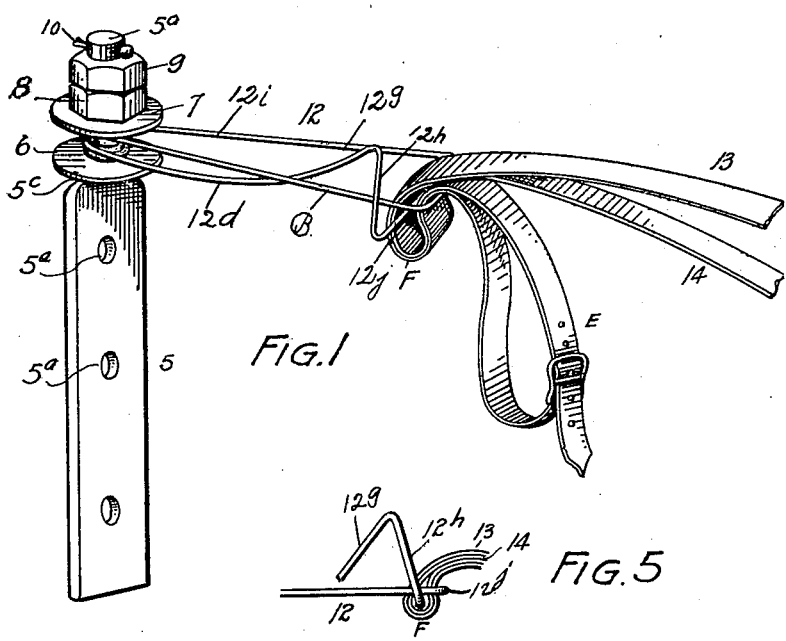
FIG. 1
FIG. 5
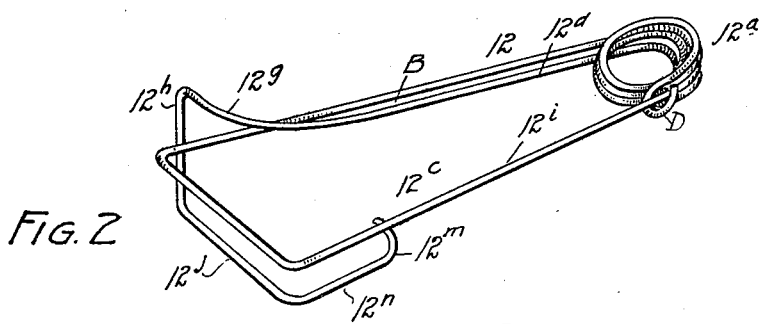
FIG. 2
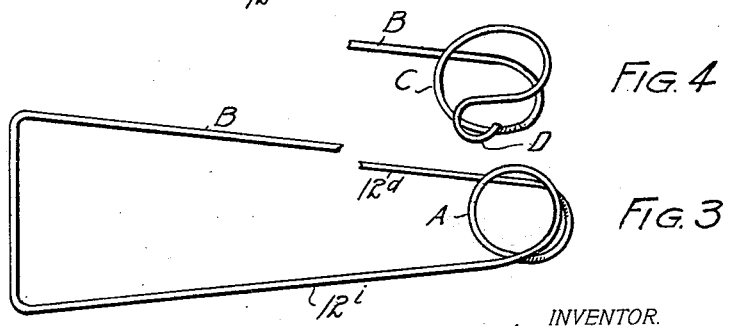
FIG. 4
FIG. 3
WITNESSES:
INVENTOR.  
Thaddeus C. Newlon  
BY  
ATTORNEY.
THE NORRIS PETERS CO., PHOTO-LITHO., WASHINGTON, D. C.

UNITED STATES PATENT OFFICE.

THADDEUS C. NEWLON, OF DOWNS, KANSAS.

LINE GRIP OR HOLDER.

SPECIFICATION forming part of Letters Patent No. 676,390, dated June 11, 1901.

Application filed February 23, 1901. Serial No. 48,614. (No model.)

*To all whom it may concern:*

Be it known that I, THADDEUS C. NEWLON, a citizen of the United States of America, residing at Downs, in the county of Osborne and State of Kansas, have invented certain new and useful Improvements in Line Grips or Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in line grips or holders adapted for use by teamsters and others who may have occasion to leave their teams, my object being to provide a device adapted to be attached to the wagon or vehicle within convenient reach of the driver and constructed to hold the lines in any desired position of adjustment, whereby the driver may temporarily leave his team with perfect safety, since the device will hold the lines so tightly that the horses cannot straighten the slackened traces of the harness in the driver's absence.

My further object is to provide a device of this class which shall be simple in construction, economical in cost, exceedingly durable in use, and not liable to get easily out of repair.

To these ends the invention consists of the features hereinafter described and claimed, all of which will be fully understood by reference to the accompanying drawings, in which is llustrated an embodiment thereof.

In the drawings, Figure 1 is a perspective view illlustrating my improved device in use. Fig. 2 is a perspective view of the grip or holder proper detached from its support or shank. Figs. 3 and 4 are fragmentary views illustrating the manner of constructing the device. Fig. 5 is a fragmentary view similar to Fig. 1, but showing the two members of the gripping device drawn tightly together with the lines in place, while in Fig. 1 the loop of the lines is shown loose to facilitate clearness of illustration.

The same reference characters indicate the same parts in all the views.

Let the numeral 5 designate a shank composed of a piece of metal of suitable strength and of any desired length adapted to be attached to the dashboard or to the side of the wagon-box, within easy reach of the driver, by passing screws or bolts through the openings $5^a$ formed therein. Upon the upper part of this shank is formed a shoulder $5^c$, and extending upward from this shoulder is a threaded reduced portion $5^d$. Upon this threaded portion and engaging the shoulder $5^c$ is placed a washer 6, while immediately above this washer is located a number of wire convolutions forming a part of the gripping device proper. Above the gripping device is located another washer 7, while above this last-named washer and engaging the same is located a nut 8, above which is placed a jam-nut 9. In the upper extremity of the threaded part $5^d$ is formed a transverse opening, in which may be inserted a key 10, if desired, though ordinarily the jam-nut will be found sufficient.

The gripping device 12 is formed from a single piece of wire and consists of a number of convolutions $12^a$, a closed loop $12^e$, a part $12^d$, extending along one arm of the loop upwardly inside of this arm, forming a part $12^g$, and then downwardly on the outside of the loop-arm, as shown at $12^h$, to a position below the loop, when another bend is formed and the wire carried transversely beneath the loop and in the rear of its forward extremity, as shown at $12^j$, to a position outside the loop-arm $12^i$, when another bend is formed and the wire carried rearwardly or toward the shank 5 a short distance, as shown at $12^n$, and finally bent inwardly, terminating a short distance inside the loop, as shown at $12^m$. The convolutions $12^a$ of the device pass around the shank part $5^d$, between the washers 6 and 7, forming a sort of bearing or hub arranged to turn on the shank part. The ease with which the device turns on its shank or support is regulated by the adjusting-nut 8.

In forming the device the wire is first coiled around the stem $5^d$ of the shank, as shown at A, Fig. 3, and then carried outwardly, forming the loop-arm $12^i$, and rearwardly, forming the opposite loop-arm B, which is broken in Fig. 3 and continued in Fig. 4, forming another coil C and terminating in a hook D, which is fastened to the arm 12¹ at the coiled bearing 12ᵃ. The formation of the other parts has already been described in detail.

In applying the lines 13 and 14 to the device their buckled or otherwise fastened extremities are formed into a loop E. (See Fig. 1.) A loop F is then formed. The lines are then held in the hand with the loop E uppermost, while the loop F is passed down through the opening of the wire loop 12ᶜ, slipped onto the hook 12ᵐ, and thence to the part 12ʲ, the loop E being turned during the operation to occupy the position shown in Fig. 1. The lines 13 and 14, leading to the heads of the horses, (not shown,) are then supposed to be drawn taut (see Fig. 5) and the loop F clasped between the part 12ʲ and the outer extremity of the wire loop 12ᶜ. The part 12ᵍ allows the part 12ʲ to extend far enough below the loop 12 to make room for the lines, whether two, four, or six are employed. The part 12ʲ is normally spring-held below the loop 12, substantially as shown in the drawings. The part 12ᵈ, being passed up on one side of the arm B to form the part 12ᵍ and then down on the other side, causes the two members of the device to maintain their proper relative position. The part 12ⁿ passes outside of the loop far enough to prevent the said part from passing upwardly inside the loop under any circumstances. This is necessary, otherwise the device would be inoperative, or at least partially so. When the lines are in the position as before described, they are securely held as adjusted, and a pull on either line separately or both lines simultaneously only draws the lines tighter and causes them to be more firmly gripped by my improved device. If the horses turn to one side or the other, the device turns on its shank, as heretofore explained, and the pull is always straight or in line with the position of the device.

Having thus described my invention, what I claim is—

1. In a line grip or holder the combination with a suitable stationary support, of an upright shank suitably secured thereto, a loop attached to the shank and projecting outwardly therefrom, and a coöperating member also attached to the shank and extending outwardly from the same, and transversely of the loop in proximity to its forward extremity, finally terminating in a free extremity upon which the loop of the lines is adapted to slip and pass to position, whereby they are gripped and securely held by the two parts of the device.

2. In a line-grip the combination of an upright supporting shank, or rod, a loop attached thereto and extending outwardly therefrom, a coöperating member also extending outwardly from the shank, its forward portion extending transversely of the loop and below the same, and provided with a free extremity upon which the loop of the lines may be slipped to position.

3. In a line-grip the combination of an upright shank, a loop attached thereto and extending therefrom, a coöperating spring-held member also extending outwardly from the shank to which it is attached, its forward portion extending transversely of the loop and below the same, and provided with a free extremity upon which the loop of the lines may be slipped to position.

4. In a line grip or holder, the combination with a suitable support, of a loop extending outwardly from said support, and a coöperating member also extending outwardly from the support, upwardly inside of the loop, downwardly outside of the loop to a point below the latter, transversely below the loop to a position beyond the opposite side of the loop, rearwardly toward the support, and inwardly terminating between the loop-arms, to allow the loop of the lines to be slipped to position thereon.

5. The combination with a shank, of a line-grip composed of wire coiled around the shank, extending outwardly to form a closed loop, and again outwardly and up inside of the loop and above the same, downwardly outside of the loop, transversely in proximity to the front end of the loop, and rearwardly toward the shank or support, and finally inwardly where it terminates.

6. In a line grip or holder the combination of a threaded shank provided with a shoulder above which projects a stud provided with two separated washers, a line grip or holder attached to said stud between the washers, and a nut secured on the stem above the uppermost washer, the line-grip comprising a loop projecting outwardly, and a coöperating member also extending outwardly from the shank and transversely of the loop in proximity to its forward extremity, finally terminating in a free extremity upon which the loop of the lines is adapted to slip and pass to position, whereby they are gripped and securely held in place.

7. The combination of a threaded shank provided with a shoulder above which projects a stem provided with two separated washers, a line grip or holder mounted on the stem, and arranged to turn thereon between the washers, and suitable means located above the uppermost washer for holding the grip in place, the said grip comprising a loop projecting outwardly from the shank, and a coöperating member also extending outwardly from the shank and transversely of the loop in proximity to its forward extremity, finally terminating in a free extremity upon which the loop of the lines is adapted to slip and pass to position, whereby they are gripped and securely held in place.

8. The combination of a shank or support having a shoulder and a threaded stem extending above the shoulder, of two washers mounted on the stem, and a line grip or holder composed of wire coiled around the stem between the washers and comprising two members, consisting of a loop extending outwardly from the shank, the other member extending outwardly along one side of the loop, upwardly inside the loop, downwardly outside the loop, across beneath the front of the loop, rearwardly toward the shank and inwardly where the wire terminates.

In testimony whereof I affix my signature in presence of two witnesses.

THADDEUS C. NEWLON.

Witnesses:
    A. J. O'BRIEN,
    MARY C. LAMB.